United States Patent [19]

Debayeux et al.

[11] 4,335,676

[45] Jun. 22, 1982

[54] DEVICE FOR REGULATING A GASEOUS FLOWSTREAM INTRODUCED INTO A SPOUTED BED GRANULATING AND/OR COATING APPARATUS

[75] Inventors: Christian Debayeux, Toulouse; Hubert Lacroix, Villeneuve Tolosane; Felix Sternicha, Toulouse, all of France

[73] Assignee: Societe Chimique des Charbonnages S.A., Paris La Defense, France

[21] Appl. No.: 212,047

[22] Filed: Dec. 1, 1980

[30] Foreign Application Priority Data

Nov. 30, 1979 [FR] France .................................. 79 29463

[51] Int. Cl.³ .............................. B01J 2/16; B05C 5/00
[52] U.S. Cl. .............................. 118/303; 118/DIG. 5; 427/213
[58] Field of Search ............. 118/303, 62, 24, DIG. 5; 427/213

[56] References Cited

U.S. PATENT DOCUMENTS 3,110,626  11/1963  Larson .................................. 118/24

Primary Examiner—Ralph S. Kendall
Attorney, Agent, or Firm—Millen & White

[57] ABSTRACT

A device for introducing a gaseous flow stream in an apparatus for granulating and coating particles in a spouted bed including a flow directing structure located between the spouted bed containing portion of the device and the gaseous flowstream feeding portion. The flow directing structure directs the gaseous flow stream in the upward direction for preventing contact and agglomeration of particles in the vicinity of walls of the device.

3 Claims, 1 Drawing Figure

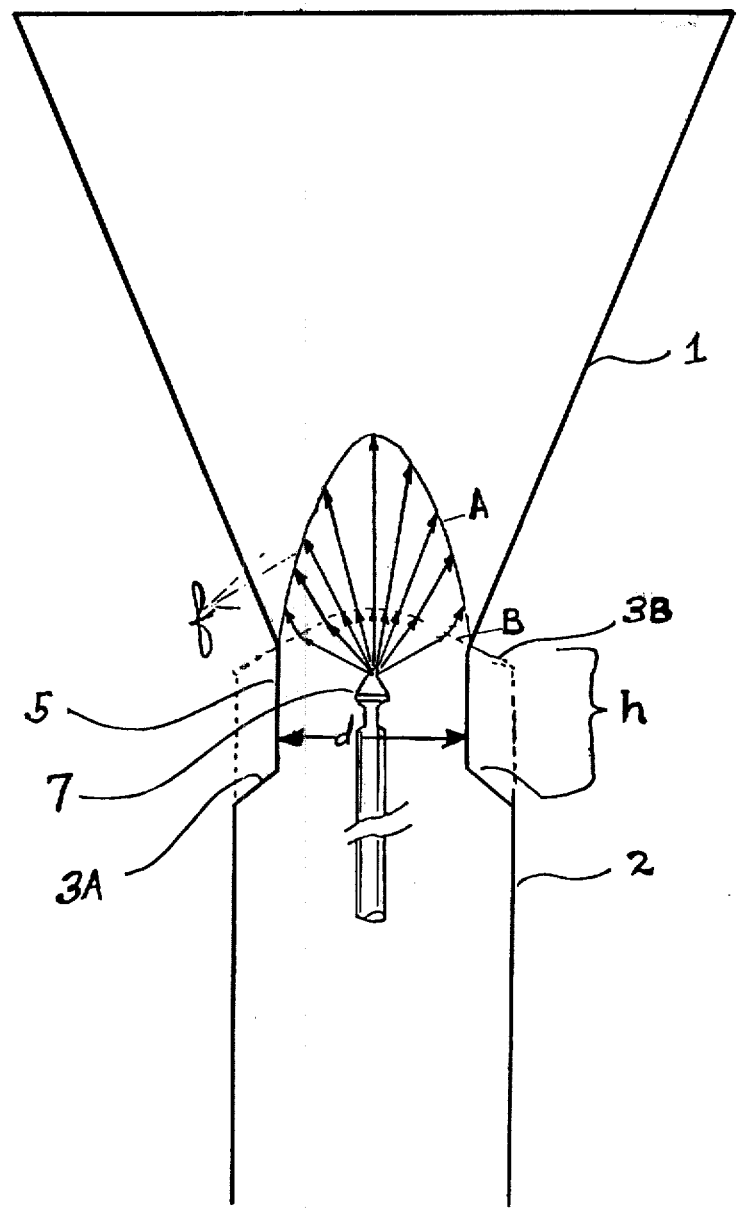

DEVICE FOR REGULATING A GASEOUS FLOWSTREAM INTRODUCED INTO A SPOUTED BED GRANULATING AND/OR COATING APPARATUS

BACKGROUND OF THE INVENTION

The invention relates to an improved device for introducing a gaseous flow stream in an apparatus for granulating and/or coating particles in a spouted bed.

Spouted beds are beds of particles obtained in an enclosure having a vertical axis and fitted at the lower part with a frustoconical part terminating at a bottom opening through which there is introduced an upwardly directed gaseous flowstream. The upwardly directed gaseous flowstream maintains the particles in suspension and carries them along closed paths. Thus, the particles are directed upwardly by the gaseous flowstream in the neighborhood of the axis of the enclosure in the form of a spout or geyser. They move radially toward the wall of the enclosure and then slowly downward until they return to the tip of the frustoconical part. The gaseous flowstream creates, at the lower part of the bed in the frustoconical part, a pocket or pouch like area devoid of particles. Spouted beds of the type to which the invention is directed are described in French Pat. No. 1,125,461 filed on Mar. 11, 1955 and assigned to the National Research Council.

It is presently well known to use a spouted bed for granulating fluid products and hardening either by evaporating water or another solvent or by cooling, and/or for coating previously prepared particles or cores with these hardenable fluid products. According to the known granulating processes, a spouted bed of forming granules or of particles to be coated is maintained by means of a hot or cold upward gaseous flow stream with the hardenable product atomized in the gaseous flowstream beneath the spouted bed. The atomized hardenable fluid product is partly evaporated or cooled in the gaseous flowstream. More particularly, the evaporation or cooling occurs when it crosses the pocket or pouch like area which is devoid of granules, and subsequently deposits on the particles of the spouted bed in the lower part of the frustoconical part. The layer of atomized product continues evaporating or cooling until solidification is obtained as the particles are carried upwardly again by the gaseous flowstream in the axial spout, and while they return downward along the walls of the enclosure. When the particles again reach the lower part of the frustoconical part of the enclosure, they receive a new coating of atomized product. Thus, granulation and/or coating is accomplished by successive deposits or layers of atomized hardenable product. Such a granulating process is described in U.S. Pat. No. 3,231,413, filed Jan. 25, 1966 and assigned to Potasse et Engrais Chimiques.

The apparatuses used up to now for granulating in spouted beds include an enclosure having a vertical axis and having a lower frustoconical part with a cylindrical part on top. For continuous operation, the enclosure has at the upper part of the spouted bed, a laterally extending passage for continuously drawing the granules off. The described upwardly directed gaseous flowstream is introduced through the small base of the frustoconical part of the enclosure. The spray nozzle for the substance to be granulated, or for the coating substance, is positioned in the vicinity of the small base of the frustoconical part of the enclosure.

In the apparatuses proposed up to now, the junction between the duct pipe for introducing the gaseous flowstream, and the base having a diameter d, of the frustoconical part, make up a converging-diverging system. The duct pipe for introducing the gaseous flowstream has a diameter larger than d and also terminates in a frustoconical part, the small base of which has a diameter equal to d. It was thought that by using a converging-diverging system in which the gaseous stream is noticeably accelerated, the spraying of the fluid hardenable product and therefore, the granulating and/or coating would be facilitated. However, it was found that such a device did not perform satisfactorily when operating continuously. More particularly, in apparatuses having a large diameter, the gaseous flowstream is not homogeneously distributed as a result of the dynamic pressure being greater in the vicinity of the walls of the frustoconical part than in the vicinity of the axis. Therefore, large agglomerated particles are formed in the lower part of the frustoconical part and often block up the spouted bed after 2 or 3 hours of operation.

Another type of prior art device and process is disclosed in U.S. Pat. No. 3,110,626 which is assigned to Minnesota Mining and Manufacturing Co. which uses a venturitype structure to control coating and granulation which includes a guidance element supported within either a conical or tubular structure. The guidance element can have one of a variety of shapes and cooperates with a multiply diverging and converging structure to improve particle coating and granulation. This type of device has the disadvantage however, that it is very expensive and more complicated to manufacture than the device and process of the present invention.

SUMMARY OF THE INVENTION

The present invention is directed to a modified device for introducing a gaseous flowstream which has as an object obtaining a more homogenous gaseous flowstream below the bed, and avoiding the formation of big agglomerated particles in the bed. These and other objects will become evident from a reading of the description of the invention which follows.

The device of the present invention concerns an improved device for introducing a gaseous flowstream in apparatuses for granulating and/or coating in spouted beds. The device includes a downwardly diverging frustoconical part, the base of which has the smaller diameter d and is joined to an upwardly converging frustoconical part of the duct pipe having a top end which has a smaller diameter equal to d. The present invention is characterized by the fact that between the small bases of diameter d of the diverging frustoconical part of the enclosure and the converging frustoconical part of the pipe duct for spouting gas, there is a cylindrical part having a height of a proportion which ranges between 0.5 d and 0.66 d attached therebetween.

Upon further study of the specification and appended claims, further objects and advantages of this invention will become apparent to those skilled in the art.

BRIEF DESCRIPTION OF THE FIGURE

The FIGURE is a schematic side view of the device of the present invention showing the pocket or size and shape of the pouch like area which is created therewith.

and the dashed lines in the FIGURE showing the prior art structure and pouch like area resulting thereform.

DETAILED DESCRIPTION OF THE INVENTION

Referring to the FIGURE, the dashed lines represent a prior art type device. Generally, the devices of the prior art include an upper frustoconical part 1 which converges in a downwardly direction. The upper frustoconical part 1 is filled with particles which are to be coated and or granulated.

There is a cylindrically shaped duct pipe 2 located below the upper frustoconical part 1 for introducing an upwardly directed gaseous flowstream into the upper frustoconical part 1. The duct pipe 2 includes a lower frustoconical part 3B located on the top thereof and connecting the duct pipe 3B to the upper frustoconical part 1.

The lower frustoconical part 3B converges in the upward direction for accelerating the gaseous flow into the upper frustoconical part 1. By placing a liquid spray atomizer 7 coaxially within the duct pipe 2 with the outlet of the atomizer 7 positioned at a level immediately below the connection to the upper frustoconical part 1, the gaseous flowstream forms a pocket or pouch like area B which is devoid of particles and within which the fluid coming out of the atomizer is dispersed for coating the granulated particles in the upper frustoconical part 1. The pouch like area B generated by this type of structure was too small and thus, the granulation and coating of particles not completely effective and resulting in an agglomeration and blockage forming eventually at the lower part of the upper frustoconical part 1.

To eliminate this problem, the present invention includes a cylindrical portion 5 which has a diameter d which is equal to the smallest diameter of the upper frustoconical part 1. The cylindrical portion 5 is interposed between the upper frustoconical part 1 and, in this case, the lower frustoconical part 3A. The atomizer 7 is now positioned higher, relative to the lower frustoconical part 3A, than in the prior art device. Nonetheless, the outlet of the atomizer 7 is located at a level immediately below the connection to the upper frustoconical part 1.

By including the cylindrical part 5 the upward gaseous flowstream forms a pocket or pouch like area A. As may be seen the sprayed particles are distributed over a larger area than with the prior art device. Specifically, in FIG. 1, the arrows f schematically represent the paths of the droplets sprayed by the atomizer 7. However, unlike the prior art device wherein a substantial amount of the droplets are directed to the side walls of enclosure, the device of the present invention results in a more upwardly directed gaseous stream and therefore flow of droplets. The risk of droplets hardening on the walls of the enclosure and creating a blockage are thus substantially reduced.

To achieve maximum dispersion, the height of the cylindrical part 5 should fall between 0.5 d and 0.66 d wherein d is the diameter of the cylindrical part 5 and the narrowest portions of the frustoconical parts 1 and 3A. If h is less than 0.5 d, the pouchlike area A is not sufficiently upwardly directed and excessively large granules are formed and directed to the walls. If h is greater than 0.66 d, the pouchlike area A is greatly upwardly directed, however, the pressure drop in the granulating apparatus is too great.

Having thus described the invention, it will become readily apparent that certain modifications may be readily apparent to those skilled in the art. The previous description is therefore intended to be by way of example only and those modifications which may be obvious to those skilled in the art are intended to be encompassed therein.

What is claimed is:

1. In an improved device for introducing a gaseous flowstream in an apparatus for granulating and/or coating particles in a spouted bed, of the type having a downwardly converging frustoconical part connected at the lower portion thereof to a pipe duct for introducing a gaseous flowstream and coating material, the pipe duct having an upwardly converging frustoconical part, the connection to the pipe duct located at the upper part of the upwardly converging frustoconical part, and the narrowest portion of both the upwardly converging and downwardly converging frustoconical parts having a diameter d, the improvement comprising:

flow directing means positioned between and connecting the downwardly converging frustoconical part to the upwardly converging frustoconical part for generating a substantially upwardly directed gaseous flowstream to create a pocket devoid of particles at the base of the downwardly converging frustconical part for homogeneously distributing the gaseous flowstream for granulating particles in the spouted bed, and said flow directing means comprising a cylindrically shaped hollow member having said diameter d, and a height h equal to 0.5 d to 0.66 d.

2. A device for introducing a gaseous flowstream according to claim 1 further comprising atomizing means positioned within said cylindrically shaped hollow member for spraying coating material droplets into the upper downwardly converging frustoconical part for having said droplets distributed within the homogeneously distributed gaseous flowstream for coating particles being granulated therein.

3. A device for introducing a gaseous flowstream according to claim 2 wherein said atomizing means comprises an atomizer arranged with its outlet located at a level immediately below the connection between the cylindrically shaped hollow member and the upper downwardly converging frustoconical part.

* * * * *